United States Patent [19]

Schueneman

[11] 4,374,681
[45] Feb. 22, 1983

[54] SYSTEM FOR CONTROLLING THE COMPOSITION OF CHEMICAL TREATMENT BATHS

[75] Inventor: John E. Schueneman, Waukegan, Ill.

[73] Assignee: Coral Chemical Company, Waukegan, Ill.

[21] Appl. No.: 262,288

[22] Filed: May 11, 1981

[51] Int. Cl.³ .............................................. C23F 5/02
[52] U.S. Cl. ............................ 148/6.14 R; 148/6.27; 118/689; 118/690; 118/697; 118/676; 427/345
[58] Field of Search ........................ 148/6.15 Z, 6.2; 118/602, 697, 668, 676, 689, 691; 427/345

[56] References Cited

U.S. PATENT DOCUMENTS

| | | | |
|---|---|---|---|
| 3,369,928 | 2/1968 | Avlow | 148/6.15 Z |
| 3,515,094 | 6/1970 | McVey | 148/6.2 |
| 3,607,453 | 9/1971 | Engesser et al. | 148/6.15 Z |
| 4,233,087 | 11/1980 | Cooke | 148/6.15 Z |

*Primary Examiner*—Sam Silverberg
*Attorney, Agent, or Firm*—FitzGibbon, Roehrig, Greenawalt & Stone

[57] ABSTRACT

An apparatus having an article counter, a set-point register and a comparator, and at least one electrode for detecting solution pH, with a controlled system adapted to add pre-selected amounts of replenishing solution to the cleaning and treating baths controlled by the system when indicated by coincidence between the number in the pre-set counter and the number in the article counter, in response to system pH, whereby the solutions being replenished will retain predetermined characteristics throughout an extended operating life. A method which comprises sampling solution pH counting the articles being treated and replenishing treatments and cleaning solutions in response to article count and pH or other solution condition from time to time to maintain desired process characteristics.

9 Claims, 6 Drawing Figures

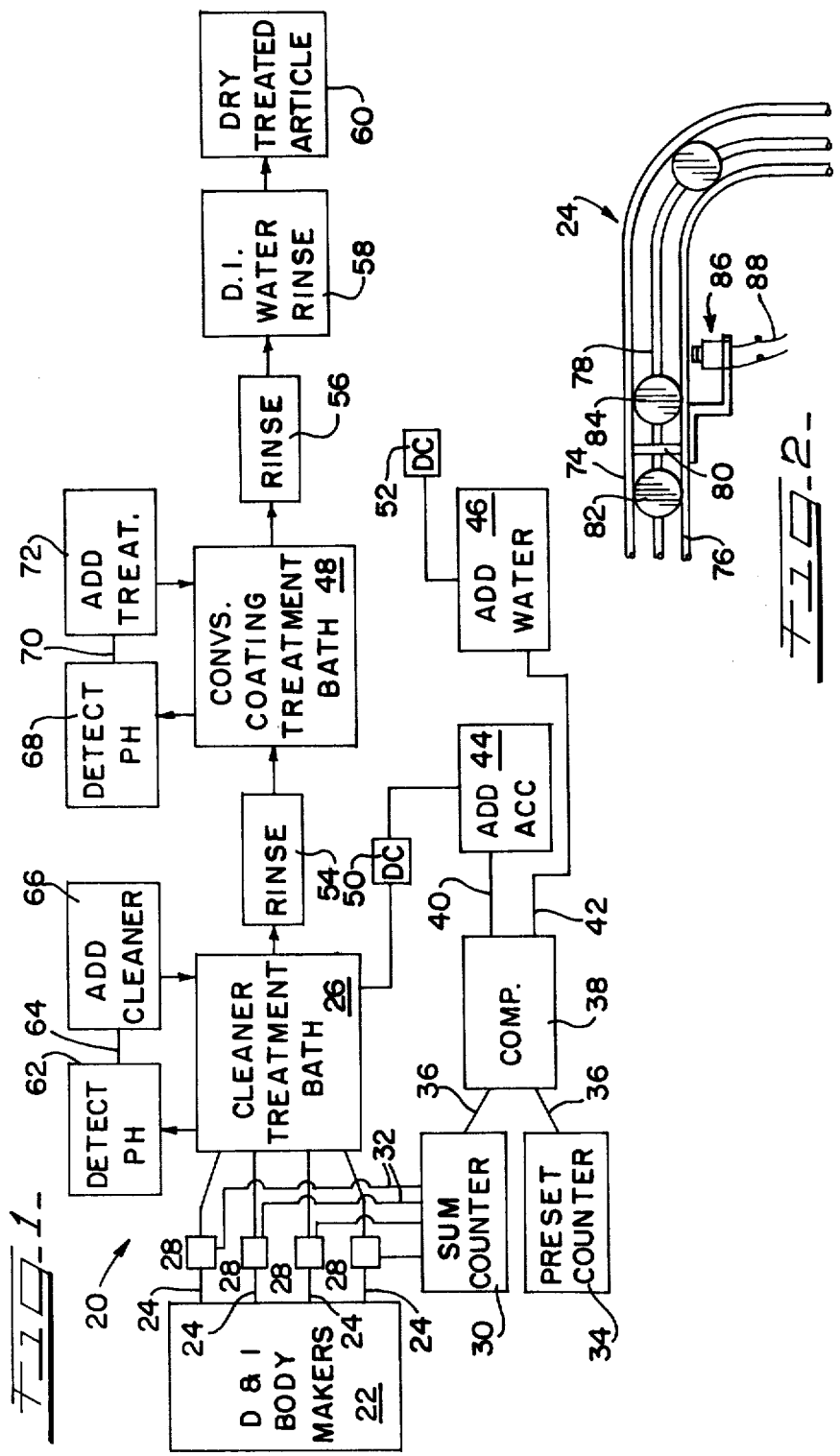

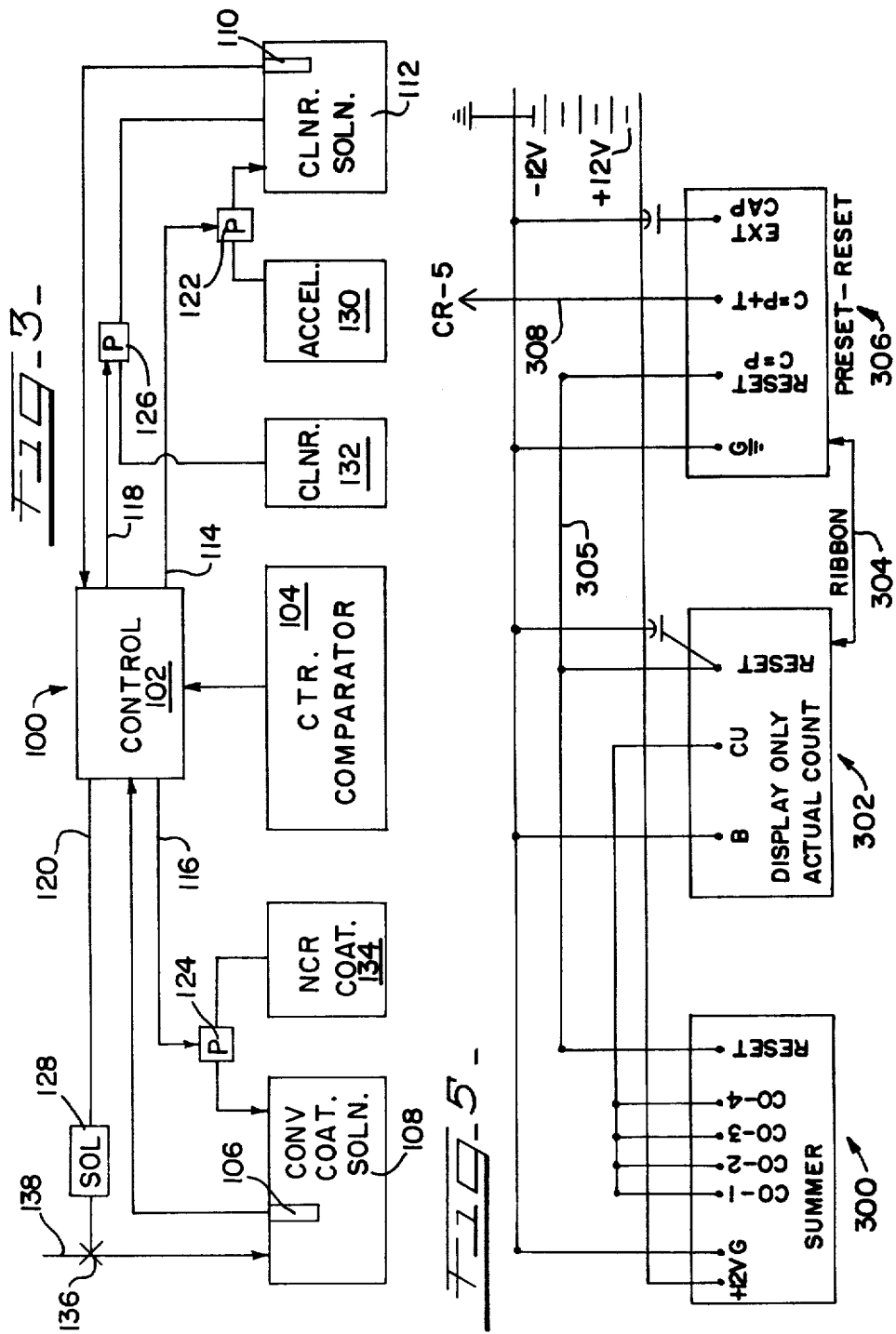

SYSTEM FOR CONTROLLING THE COMPOSITION OF CHEMICAL TREATMENT BATHS

The present invention relates generally to methods and apparatus for controlling the content of solutions used in chemical processing, and more particularly, to apparatus and methods for controlling the composition of various treating solutions used in a manufacturing process.

The control system of the invention is advantageously used in metal can-making, and is particularly advantageous when used in association with a can line wherein so-called "drawn and ironed" or "redrawn and ironed" (hereinafter D. & I. cans) are made.

In manufacturing cans of the D. & I. type, (unlike the conventional, older three-piece cans having a body and two can ends) the can bottom and sidewalls are formed in a body maker as a single can body unit by drawing a cup from an aluminum blank or other sheet, then redrawing this cup to a greater depth and a reduced diameter, following which the cans are "ironed", that is, treated in a die wherein any wrinkles or irregularities are removed from the sidewalls, because the finished can has only a single-piece body with an integral end, they are also commonly referred to as "two-piece" cans.

Thereafter, the can bodies are trimmed to an exact vertical height. After this, the cans are chemically cleaned, rinsed, treated with a "conversion coating", rinsed twice thereafter, and dried. Subsequently, the inside and outside surfaces have lacquers or other finishes applied to them. Because the sidewalls of a two-piece can do not come into existence prior to the time the body is formed, cans of this sort must be decorated, as by lithographic or flexographic techniques, as round cans rather than in flat sheets from which a cylindrical body can subsequently be formed. In the prior art, namely, in the manufacture of three-piece cans large sheets of flat metal stock were lacquered and lithographed, after which the sheets were cut into smaller sheets ("body blanks") from which the bodies were formed. Because of this method of manufacture, it was possible to have the can body forming sheet material coated with lacquer, both inside and outside before the can body was formed. After the body was formed, the can was normally given an additional one or more coats of lacquer, but these were applied to surfaces which were already well prepared to receive them.

In contrast to the techniques used in making three-piece cans, cleaning and applying conversion coatings to two-piece cans is a much more difficult process, because the metal forming the can body as it comes from the body maker is raw aluminum alloy. This material has not previously received any lacquer or other protective coatings and, consequently, cleaning it and applying a conversion coating to it is absolutely necessary as a pre-condition to the subsequent receipt by the can of both interior and exterior lacquers. The interior lacquers are critical with respect to flavor protection and the exterior coatings are critical with regard to corrosion protection and adhesion of the decorative lithographic or flexographic coatings referred to above.

According to the present invention, novel methods and apparatus are used for careful control of the compositions of the cleaning and treating baths used during these operations.

Referring again to the peculiar problems of cleaning and treating two-piece cans, the can bodies contain an adherent residue of drawing and lubricating oils, and also a residue of aluminum "fines", that is, aluminum powder, shavings, or dust resulting from the drawing, redrawing, and ironing operations. It is necessary to clean these materials from the can body surfaces, and thereafter, it is necessary to apply a so-called conversion coating, that is, a coating which converts most or all of the can body surface from a pure aluminum (or aluminum oxide) surface to a surface which possesses corrosion resistance, and strong adhesion for the organic lacquers which are to be applied to the can body.

As is well known in the art, various tests may be made to determine whether a can has been adequately cleaned and treated for these purposes; reference to these tests appear elsewhere herein.

Referring now to the general operation of apparatus for applying solutions of clean and conversion coatings, it is known in the prior art to have so-called "make-up" baths having certain proportions of ingredients for both cleaning and treating the cans. Typically, the cleaning bath comprises a sulfuric acid cleaner, together with a mixture of two or more surfactants which are used to clean the oils or the like from the can body. Normally, the cleaning solution also includes a source of fluoride, such as hydroflouric acid and/or hydorofluosilicic acid. These components are effective to dissolve the major portion of the aluminum fines, or at least separate them from the surfaces of the can bodies.

The conversion coating normally consists of an acid for establishing and maintaining pH, such as nitric acid, and also includes one or more conversion coating chemicals, typically Zirconium, or in some cases, titanium, used with a second ingredient, such as tannic acid or the like. Other conversion coatings are known to those skilled in the art, and the present invention does not depend for its operation on the use of any particular cleaner or conversion coating composition.

Referring again to the can treatment baths, a cleaning bath and a treating bath are initially provided in a typical can line, and these solutions contain so-called make-up solutions, deriving their names from the fact that, when the can line begins to operate, the solutions are initially made up of particular components in certain concentrations. In order to offset this loss of active ingredients, the cleaning and treating baths are maintained at desired levels of active ingredients by adding thereto from time to time, predetermined amounts of so-called replenishing baths. However, as the canmaking process continues, various ingredients of the cleaning and treating baths are depleted at different rates. While the cleaning and treating replenishing baths generally contain the same ingredients as their respective make-up solutions, they contain them in differing proportions, because the chemicals are depleted from the make-up baths in proportions other than the proportions originally present in the make-up solutions.

The components which comprise the cleaner replenishing solutions are a cleaner component (acid and surfactant) and an "accelerator" (fluoride-containing) component. The treatment tank is replenished by adding a replenisher and by adding water.

In the prior art, the amounts of accelerator and cleaner added as replenishers to the cleaning solution, and the amount of treating solution replenisher added to the treatment bath were determined solely by monitoring the pH and/or fluoride content of these baths. In the prior art, the addition of water to the conversion coating bath was generally determined by observation of the bath, and water was added when it was visually indicated that excessive sludge was accumulating and that the bath should be purged by flushing with fresh water or the like.

Some of the important drawbacks with prior art control methods were that, in attempting to monitor the accelerator or fluoride component of the cleaning material, resort was had to the use of fluoride ion monitoring electrodes. These units, because of the highly corrosive nature of the hyrodflouric acid bath in which they were immersed, had a relatively short life. These electrodes are normally relatively expensive and more importantly, they tended to deteriorate in accuracy and reliability as they were used, with the result they either required frequent replacement or, if not replaced, they gave inaccurate and unreliable readings.

In extremely high speed production, high quality operations, such as can making for the beer and beverage industries, inaccuracy in quality control and/or the need for frequent replacement of components are simply unacceptable.

By the same token, the need for constantly monitoring the treatment bath visually to detect the presence of a buildup of reaction products, such as sludge and the like, is also unsatisfactory.

Accordingly, there has been a need for control systems which will provide sensitivity to various operation parameters without requiring expensive and frequent replacements, and which are accurate even after long periods of use.

Customarily, in can making lines serving breweries, it is customary to begin the operation of a can making line at a certain time, at which time cleaning and treatment baths having predetermined chemical compositions are provided in the various washers of the can making line. After the line is started, it is customary to run the can making line non-stop for about six weeks, seven days a week, twenty-four hours a day, after which the line is shut down and maintenance is performed.

It is necessary, therefore, for a successful cleaning and conversion coating treatment apparatus to be capable of providing continuous control and replenishment of cleaning and treating solutions on a non-stop basis for at least six weeks, during which time literally tens of millions of cans are produced, all without requiring interruption, shut down, or significant variation from time to time of the concentration of ingredients in the cleaning and conversion coating baths. Accordingly, it is important not only to provide chemical treatment baths which are capable of insuring satisfactory operations from time to time, but also to provide apparatus and methods which are susceptible of continuous reliable operation over many millions of cycles without failure while operating within closely determined process limits.

According to the present invention, therefore, apparatus and methods are provided for carefully and accurately controlling the replenishment of the cleaning and treatment solutions from time to time during the canmaking process.

In a preferred form, the invention provides an apparatus having means for disposition adjacent selected portions of a can line for counting the number of individual cans coming from the can bodymaking to the washer along one or more feed paths, as well as means for monitoring the pH of the cleaning and treatment baths. The apparatus also includes means for establishing a can count set point, means for comparing the count to the set point, means for detecting the pH of the solutions and for comparing them to set point pHs, and means for adding fluid to the solutions when indicated by the pH and can count comparators.

In use, the addition of water to the treatment bath is purging it of reaction products and sludge and the addition of accelerator to the cleaning bath are controlled in response to can count, while addition of cleaner acid and surfactant and treatment replenisher are controlled in relation to the pH of the baths. The amounts of cleaner, accelerator, water, and treatment replenisher added from time to time are determined by the length of time the pumps or valves operate.

In view of the shortcomings of prior art apparatus for controlling process conditions at the canmaking industry, it is an object of the present invention to provide an improved control system for cleaning and conversion coating treatment baths.

Another object of the invention is to provide an improved method of controlling the content of chemical treatment baths used for cleaning metals and applying conversion coatings thereto.

A further object of the present invention is to provide an apparatus which responds to the pH of one or more treatment baths as well as to the number of articles being treated in adjusting the chemical make-up of treatment baths by periodically adding replenishing components thereto.

A still further object of the invention is to provide an apparatus which includes an article counter, a pre-settable register, and a comparator, with one or more pumps adapted to be energized when the article count equals the count in the pre-settable register to add fluid to the process system, as well as a pump or like system for replenishing other system components in response to pH changes.

Another object is to provide an apparatus to control fluoride ion in chemical baths without using an immersible electrode.

A still further object is to provide an apparatus for accurately controlling the composition of chemical baths of a corrosive nature.

Yet another further object of the invention is to provide a control system which responds to pH and article count and which permits still further control by reason of providing fluid addition in predeterminable volumes at different intervals.

The foregoing and other objects and advantages of the invention are achieved in practice by providing an apparatus having an article counter, a set-point register and a comparator, and at least one electrode for detecting solution pH, with a controlled system adapted to add pre-selected amounts of replenishing solution to the cleaning and treating baths controlled by the system when indicated by coincidence between the number in the pre-set counter and the number in the article counter, in response to system pH, whereby the solutions being replenished will retain pre-determined characteristics throughout an extended operating life. The objects are also achieved by providing a method which comprises sampling solution pH counting the articles being treated and replenishing treatments and cleaning solutions in response to article count and pH or other solution condition from time to time to maintain desired process characteristics.

The exact manner in which the foregoing objects and advantages of the invention are achieved in practice will become more clearly apparent when reference is made to the following detailed description of the various preferred embodiments of the invention set forth by way of examples illustrating the practice of the invention.

BRIEF DESCRIPTION OF THE DRAWINGS

FIG. 1 is a diagrammatic or block diagram view of a can line or like manufacturing facility wherein a plurality of cans are fed to a series of can treatment baths controlled by the apparatus of the invention;

FIG. 2 is a side elevational view of a small portion of a can line showing the relation of a typical can detector used with the invention to this portion of the can line;

FIG. 3 is another diagrammatic view of the control apparatus of the invention, showing the relation of the control to the makeup and replenishing tanks used to apply cleaning and conversion coating treatments to aluminum cans or like products;

FIG. 5 is a diagrammatic view of the operative portions of the article counter and comparator circuits forming a part of the apparatus of the present invention;

DESCRIPTION OF THE PREFERRED EMBODIMENTS OF THE INVENTION

Figure 4:
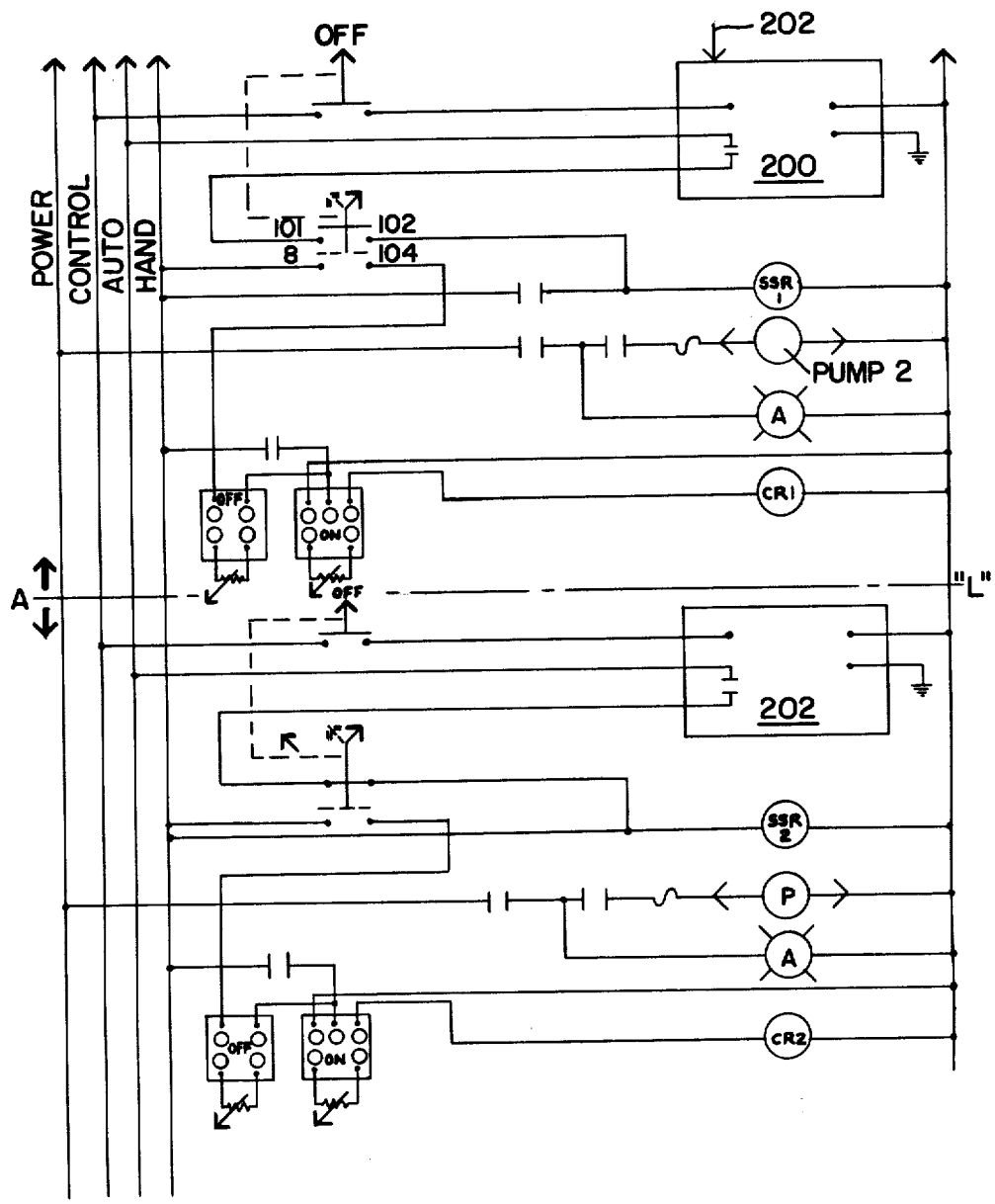
FIG. 4 is an electrical schematic view of those portions of the replenisher volume control system which are responsive to the pH of the cleaning and treating solution in the system of the invention.

While the principles of the invention are applicable to different end uses, as pointed out above, a description of the invention will be given wherein the metal to be treated is aluminum, wherein the cleaner is an acid/flyoride/detergent type cleaner, wherein the conversion coating treatment is a tannin/acid treatment, and wherein the articles being treated are two-piece, drawn and ironed (D. & I.) cans.

In the drawings, no detailed representation of most of the actual can equipment has been shown, it being understood that this equipment is not only well known to those skilled in the art, but that the type or nature of the equipment per se is not a necessary part of the invention. The invention is applicable with any process using baths for dipping, spraying or otherwise.

In the preferred form, the compositions referred to are applied by spraying, although other methods may be employed as well. The sensing mechanisms used to count the cans are shown as being placed adjacent rail type track units through which cans pass on their way to the can washer. Concerning the following description of the preferred embodiments of the invention, it will be assumed that a plurality of can bodies have been made in a D. & I. can bodymaker, and that these cans are to be supplied along plural paths to a can washer. The cans are counted on their way to the washer by individual sensors, and the pH of the solutions are monitored; this information is used to control the content of the washing and treatment solution.

Referring now to the drawings in greater detail, FIG. 1 shows the invention to be illustrated in a diagrammatic view, and to comprise a plurality of individual components arranged in a control and treatment assembly generally designated 20. This assembly is shown to include a body maker generally designated 22 and shown to have a plurality of outlet paths 24 directed towards a can cleaner bath 26. A plurality of can detectors 28 are shown, each line in or adjacent the paths 24 between the body makers 22 and the washers 26. The detectors are typically a self-contained, magnetic response type proximity detector such as those commercially available from Hyde Park Electronics, Inc., of Dayton, Ohio, etc. With suitable adjustment, these detectors will provide an output pulse each time a can passes the detector, and furnish a signal to a can counter.

In this connection, it will be noted that FIG. 1 also shows a summing counter or register 30 which receives counts through connectors 32 from each of the associated detectors 28. Accordingly, the summing register 30 will keep a cumulative count of all the cans passing from the body maker or other can body source to the washer, for purposes which will appear. Operatively associated with the summing register 30 is pre-set counter or register 34, which is adapted to be preset by the operator with a number corresponding to the number desired by the operator.

Both the summing register 30 and the pre-set register 34 are suitably connected, as by conductors 36 to a comparator 38.

When the numbers in the summing register correspond to the number in the pre-set register, the summing register is reset to zero and a signal is sent through conductors 40, 42 (1) to pump 44, which is used to add accelerator to the treatment bath 26, and (2) to a solenoid valve 46 used to control addition of water to the conversion coating treatment bath 48.

A pair of duration controls 50, 52 are associated respectively with the controls 44, 46. A rinse bath 54 is provided between the cleaner treatment bath 26 and the conversion coating treatment bath 48.

As shown, after the cans emerge from the conversion coating treatment spray bath 48, they pass through a rinse 56, following which they pass through a de-ionized water rinse 58 and finally to a drying station 60.

Referring again to FIG. 1, another aspect of the control unit of the invention is shown. Here, a pH detector 62 is shown to be operatively associated with the cleaner treatment bath, so as to receive a signal therefrom, and to be associated, as by connection 64, to a pump 66 or the like adapted to add cleaner to the cleaner treatment bath. Likewise, the conversion coating treatment bath 48 has associated therewith a means 68 for detecting the pH of the bath, a control line 70 and a pump 72 or the like adapted to add treating replenisher composition of the conversion coating treatment bath 48.

As pointed out above, the system just described is adapted to count cans received from the body makers and directed to the cleaner treatment bath, and to compare the count thereof with the number pre-set in the counter 34. The comparator is adapted to energize pumps or the like 44, 46 to add accelerator and water respectively to the cleaner and treatment baths to maintain their compositions at a desired level. At the same time, the baths 26, 48 are being monitored by the detector 62, 68, and these detectors cooperate with pumps or the like to add cleaning and treating replenishing solutions, respectively, to the baths 26, 48.

Although the invention is useful in different forms of apparatus, D. & I. can lines customarily use the baths to feed spray heads which spray the individual cans from the tops and bottoms thereof, and recover the spent solutions in the baths as shown.

Referring now to FIG. 2, a can input guide forming the path shown generally designated 24 in FIG. 1 is shown. This unit is shown to comprise top and bottom rails 74, 76 and an end rail 78, held apart by a spacer 80 to provide a can flow path. Cans 82, 84 passing along and guided by the bottom rails 76 will pass adjacent the can proximity detector generally designated 86. This detector, through the lines 88, will feed a pulsed signal to the summing counter such as the counter 30 in FIG. 1.

In reality, each body maker has one or more associated sets of guide rails to direct cans to any one of a number of selected washers to accomodate possible dislocations in manufacturing operations. According to the invention, each incoming path is equipped with its own detector.

Referring now to FIG. 3, a schematic illustration of the fluid containers and controls of the system is shown. Here, a control unit generally designated 100 is shown to include a central panel 102. The panel receives input from the counter comparator 104, which is the same as the comparator 38 in FIG. 1. Likewise, inputs to the control unit 100 are furnished from the pH electrode 106 disposed in the conversion coating solution tank 108 and from the pH detecting electrode 110 immersed in the cleaner solution tank 112. The control unit 100 also furnishes outputs, as by lines 114, 116, 118, and 120 to the various pump units 122, 124, and 126, and to the water control solenoid 128.

The pump 122 operates in response to the comparator input, and pumps accelerator solution from the replenisher reservoir 130 into the cleaner solution tank 112. The pump 126 operates in response to the pH in the tank 112 to pump fluid from the cleaner replenisher storage tank 132 into the cleaner solution tank 112.

The pump 124 draws conversion coating replenishing solution from the tank 134 and feeds it to the conversion coating solution tank 108. The solenoid 128 controls a valve 136 in the fresh water line 138. When energized, the solenoid 128 permits sufficient fresh water to flow through the line 138 to cause the tank 108 to overflow and purge itself of the reaction products, such as tannin sludge and the like, contained therein.

Referring now to FIG. 4, an electrical schematic diagram of one portion of the pump control of the invention is shown. The lines to the left of FIG. 4 are appropriately labeled respectively as "power," "control," "automatic" and "hand," to illustrate their associated circuits. By reference to FIG. 4, it will be noted that this circuit drawing shows upper and lower halves which are identical except for their numbers. Accordingly, only one-half of the drawing will be described in detail.

The principal components of the circuit of FIG. 4 include a cleaner replenishing pH control circuit 200, having an input 202 which will be understood as coming from an appropriate pH detector such as the controller and detector 62 in FIG. 1.

Switch contacts 3 and 3A are made when it is desired to operate the unit, passing control current to the basic unit 200. The switch of FIG. 4 is placed in the automatic mode, closing contacts 101, 102 (FIG. 4 only). SSR1 is understood to be a solid state relay.

The contacts NO-C in the control unit 200 are normally open contacts. When an input from the line 202 is received, indicating that the acid level has dropped below a given threshold (the pH is numerically higher than the pH set points), the normally opened contacts NO-C close. This energizes the solid state relay SSR1. This makes contacts 1, 3, illuminating signal light A and energizing pump 2. The pump continues to operate for a preset duration adjustable by the operator (duration control units or timers 50, 52 in FIG. 1). The interlock I is merely a safety device whose operation is not pertinent to the invention, but which is provided to insure that the pump does not operate when the line is down and the spray washers are not operating. The pH controller is a commercially available unit known as a FOXBORO.

The pumps are commercially available units adjustable for time and stroke made by the BIF company, division of General Signal, of West Warwick, R.I., and identified as Chem-O-Feeder pumps, Model 1200. They are preferably low volume, (10 g.p.h.) high accuracy units, having corrosion resistant seals and other components.

FIG. 4 also shows a back-up "hand", or manual operating mode. Here, adjustable timers marked "OFF" and "ON" are provided. In "hand" operation, contacts 101, 102 are broken and contacts 8 and 104 are made. This energizes the "OFF" timer, a delay-on-make timer. After this unit times out, the "ON" timer is energized, contacts CR1 are made, and the pump operates for a duration determined by the value to which the potentiometer in the "ON" timer is set. After the "ON" unit times out, the pump stops and the cycle is repeated. As shown by the large arrows "A" in FIG. 4, the circuit portions under the broken line "L" in FIG. 4 are the same in construction and operation as their counterparts above the line; these include pH comparator or control 202, solid state relay SSR2, etc.

Referring now to FIG. 5, the essence of the counter and comparator circuits are shown. Here, the circuit is shown to include a plurality of low voltage units, including an anticoincidence summer generally designated 300 and shown to have a +12 volt input and a ground terminal for power, and shown to include four counter inputs CO-1, CO-2, etc., and a reset control. The anticoincidence feature is designed to insure that if two or more pulses arrive simultaneously at the summer or summing register, a suitable delay will ensue that both individual pulses will be counted. The outputs CO-1, CO-2, etc., are connected as shown to the "CU" or "count-up" terminal of a "display only", actual count register generally designated 302. This unit includes a reset terminal and a capacitor as shown. A connection, as by a ribbon 304 or the like, connects this unit to the preset-reset counter generally designated 306.

This unit includes a ground terminal, a reset or C=P terminal, and a C=P+T terminal having an output line 308 directed to the CR-5 pin to which reference will be made later. An additional capacitor terminal is provided to increase the time delay so that the relay activated by the output signal will have time to latch. The preset/reset counter 306 is a known type of thumb wheel adjustable digital comparator into which is set to any number selected by the operator.

As pointed out, when the number in the display only register 302 matches that in the preset register, (C=P) the register 302 will be reset to zero by a pulse in line 305. The C=P+T is a terminal which emits a pulse indicative of a condition wherein the count equals the preset number, while the additional time delay provided for relay latching is pointed out above. The CR-5 pin appears in FIG. 6, and is the input for the pump and solenoid signals.

Figure 6:
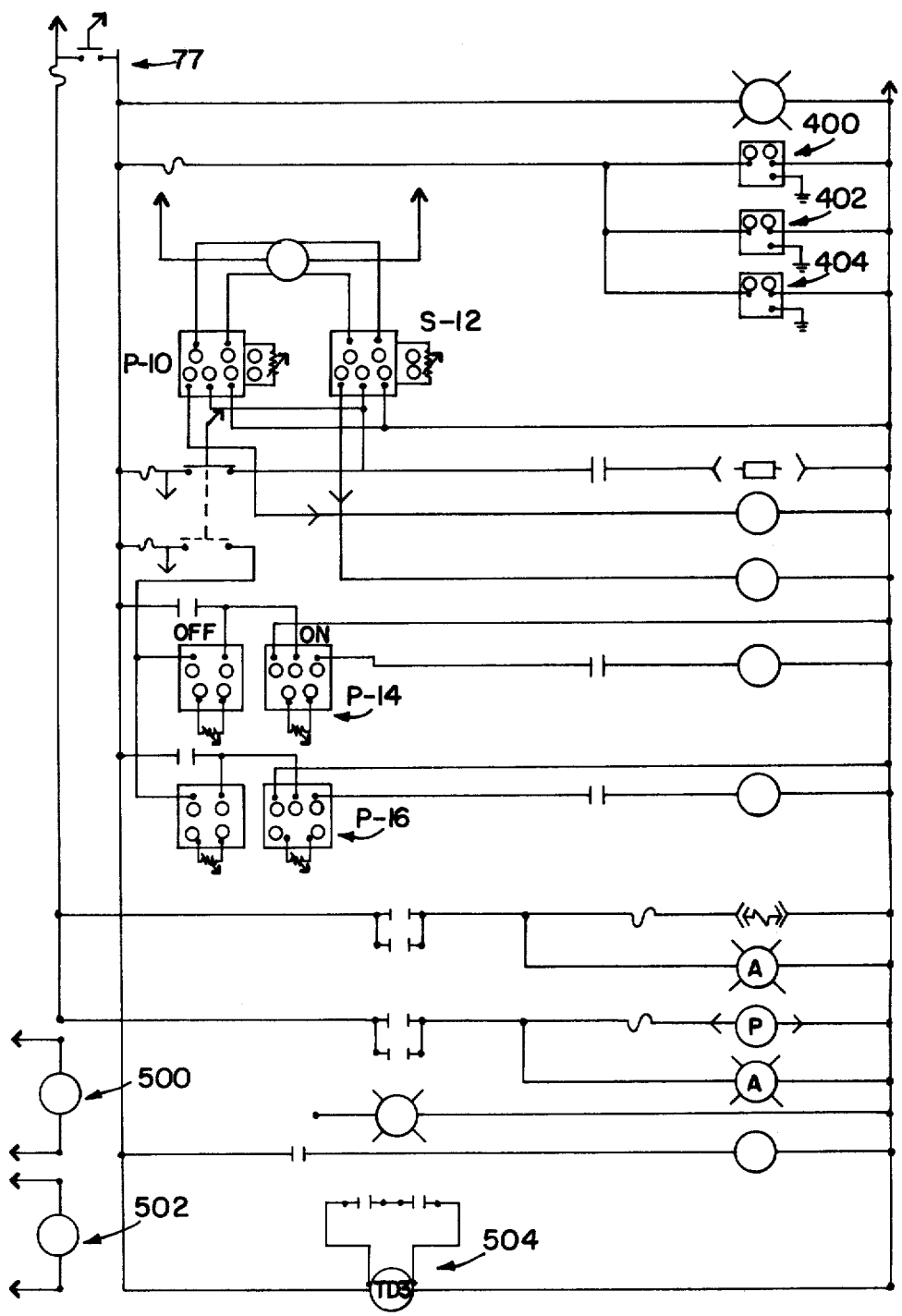
FIG. 6 is an electrical schematic view of those portions of the replenisher volume control system which are energized in response to the number of articles treated by the system.

Referring now to FIG. 6, this illustration shows the power supplies 400, 402, 404, which take line voltage from line L-3 when the off-on switch 77 is made. The supplies power the logic and low voltage portions of the apparatus. An important part of this circuit is the relay CR-5, which receives an output from the C=P+T line (see also FIG. 5) as indicated, when there is coincidence between the count up or summing register and the preset register. In this condition, the output terminals of CR-5 are simultaneously energized. This energizes both controls P-10 and S-12, which are energized when their contacts are momentarily closed. These normally open contacts then remain closed until the timers, under the control of the variable resistors shown, time out. Accordingly, the timers associated with the controls P-10 and S-12 may be adjusted to time out independently of each other. As shown, when the units are energized, the left hand unit P-10 operates the pump for the predetermined time necessary to add the desired volume of accelerator solution to the cleaner tank. The right hand or S-12 control operates the solenoid which remains open for the time determined by the setting of its associated potentiometer, adding water to the treatment tank from a fresh water source (138 of FIG. 3).

As is the case with its counterpart, in FIG. 4, the unit of FIG. 6 also includes the manual backup controls shown generally as pairs of controls P-14 and P-16. As described in connection with their counterparts, these units include delay-on-make (OFF) and delay-on-break (ON) units which are energized when the unit is placed in the hand or manual position. In this case, current is supplied to the delay-on-make timer, which determines the "OFF" time of the circuit, inasmuch as its contacts are not made until the predetermined delay time has elapsed. Thereafter, the delay-on-make unit is energized, and its contacts remain closed during the predetermined time during which its associated pump or solenoid is intended to operate, after which it times out and is de-energized.

As shown, the relays in turn operate other contactors so that the current can be provided directly to the pump or associated solenoid. The unit P-16 operates in the same manner, that is, when manually energized, it remains delayed in the delay on make mode until it has timed out, following which it energizes its associated relay which in turn pulls in the contacts required to energize the pump for the period of time determined by the setting on its associated potentiometer.

The other portions of FIG. 6 are not important to the essential operation of the invention, but certain elements thereof, including the "no can" unit 500, the "no mat" unit 502, and the TDB unit 504 are provided as safety devices. The "no can" detector prevents the pumps or solenoids from operating when no cans are being fed to the washer unit; the "no mat" unit prevents operation when no cans are leaving the washer, and the unit 504 is a safety device in the form of a delay lockout to insure that, once the line has stopped or is being "jogged", a predetermined time delay must occur before the entire control unit can be re-energized. In other words, unless the line has been running for a significant period of time, say five minutes or more, the operation of the controls referred to herein is temporarily locked out, thus preventing erratic operation of the system during manual or intermittent operation.

In use, the control system of the invention has provided a number of advantages and characteristics including elimination of the need to use unreliable fluoride electrodes. Its ability to achieve control by manually changing the volume of material added from time to time provides whatever adjustments may be required to be made from time to time in operating the system.

It will thus be seen that the present invention provides a novel control system and method having a number of advantages and characteristics including those pointed out above and others which are inherent in the invention. A preferred embodiment of the invention having been described by way of illustration, it is anticipated that changes and modifications of the described control system and method will occur to those skilled in the art and that such changes and modifications may be made without departing from the spirit of the invention or the scope of the appended claims.

I claim:

1. A control apparatus for detecting and controlling the composition of chemical cleaning and conversion coating treatment baths used in the production of individual manufactured metal articles, said apparatus comprising, in combination, a containing tank means for receiving a chemical cleaning solution and containing tank means for receiving a chemical conversion coating solution, a control system adapted to control periodic replenishment of the solutions in said chemical cleaning solution containing tank means and said chemical conversion coating containing tank means, said control system including means for detecting the pH of said solutions in said tank means, first comparator means for comparing said pH to a predeterminable set point pH, and first dispensing means for delivery of a predeterminable volume of replenishing fluid to said tank means in response to said detected and set point pHs, second dispensing means for adding a predeterminable amount of chemical cleaning accelerator to said chemical cleaning solution containing tank means, said second dispensing means including counting means for determining the number of manufactured articles supplied from time to time to said cleaning and treatment tank means, second comparator means for comparing the number of said articles supplied for treatment to a set point number, and coincidence determining means responsive to coincidence in said number of articles counted and said set point number for energizing said adding means, whereby the conditions in said cleaning and treating tanks may be made to depend both on pH conditions in said tanks and on the number of articles treated by said apparatus.

2. A control apparatus as defined in claim 1 wherein said apparatus further includes means for adding a predeterminable amount of water to said conversion coating solution contaning tank in response to coincidence of said number of articles and said set point number.

3. A control apparatus as defined in claim 1 wherein said counting means for determining said number of manufactured articles is an article proximity sensor.

4. A control apparatus as defined in claim 2 wherein said means for controlling the amount of said accelerator to said cleaning solution contaning tank and for controlling said water to said conversion coating solution containing tank includes means for counting the number of articles received by said cleaning and coating tanks.

5. A control apparatus as defined in claim 2 wherein said second comparator means for comparing said number of articles to a predetermined set point number, in response to coincidence between said number of articles and said predetermined, number, controls the amount of chemical accelerator and water added to said cleaning solution containing and conversion coating solution containing tanks, respectively.

6. An apparatus for controlling the conditions under which a plurality of individual metal articles are treated by receiving cleaning and conversion coating treatments, said apparatus including means for supplying a replenisher to a cleaner tank and means for supplying an accelerator to said cleaner tank, means for supplying a replenisher to a conversion coating treatment tank and means for supplying water to said conversion coating treatment tank, an electrode for determining the pH of the solution existing from time to time in the cleaner tank, and an electrode for determining the pH of the solution existing from time to time in the conversion coating treatment tank, means for controlling the amount of the replenisher solution to said cleaner tank, means for controlling the amount of accelerator to said cleaner tank, means for controlling the amount of replenisher to the conversion coating treatment tank, and means for controlling the amount of fresh water to the conversion coating treatment tank, said means for controlling the amount of said cleaner replenishing solution and conversion coating replenisher solution comprises pumps responsive respectively to the pH of said cleaner tank and said conversion coating treatment tank, means for counting the number of articles being cleaned and treated and means for establishing a predetermined number of articles, said means for controlling the amount of said accelerator and said fresh water being responsive to coincidence and between the count of said number of articles and said preset number.

7. A method of controlling conditions present in the cleaning and conversion coating treatment tanks of a production line having means for cleaning and treating a plurality of manufactured articles, said method comprising detecting the pH of chemical solutions in said cleaning and conversion coating treatment tanks, comparing said detected pH to a predetermined set point pH, and supplying additional cleaner material to said cleaning tank when a predetermined variation responsive to said set point pH is reached, supplying additional conversion coating material to said conversion coating tank when a predetermined variation responsive to said conversion coating tank set point pH is reached, counting the number of said manufactured articles being presented to said cleaning and conversion coating tank area for treatment, establishing a predetermined set point count of articles, comparing the number in said count of manufactured articles to the said set point number, and adding a predeterminable amount of accelerator to said cleaner treatment tank when said actual count number and said set point number coincide, whereby certain compositions of said cleaning and treating tanks are determined in response to the pH thereof, and other conditions are determined in response to the number of articles treated from time to time.

8. A method as defined in claim 7 which further includes adding water to said conversion coating treatment tank when said article number and said set point number coincide.

9. A control apparatus as defined in claim 1 wherein said apparatus further includes means for adding a predeterminable amount of accelerator to said chemical cleaning solution containing tank means in response to said coincidence number of articles and said preset point number.

* * * * *